(12) United States Patent
Painter et al.

(10) Patent No.: US 7,040,164 B2
(45) Date of Patent: May 9, 2006

(54) METHOD OF SIMULTANEOUSLY AND DIRECTLY GENERATING AN ANGULAR POSITION AND ANGULAR VELOCITY MEASUREMENT IN A MICROMACHINED GYROSCOPE

(75) Inventors: Chris Painter, Irvine, CA (US); Andrei M. Shkel, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/996,565

(22) Filed: Nov. 23, 2004

(65) Prior Publication Data

US 2005/0150296 A1    Jul. 14, 2005

Related U.S. Application Data

(60) Provisional application No. 60/527,419, filed on Dec. 4, 2003.

(51) Int. Cl.
*G01C 19/00* (2006.01)
*G01P 3/44* (2006.01)

(52) U.S. Cl. ............... 73/504.13; 73/504.02; 73/504.09

(58) Field of Classification Search ............. 73/504.02, 73/504.04, 504.08, 504.09, 504.11, 504.13, 73/510; 702/147, 151
See application file for complete search history.

(56) References Cited

U.S. PATENT DOCUMENTS

| 4,240,302 | A  | * | 12/1980 | Karnick ..................... 74/5.46 |
| 5,712,427 | A  | * | 1/1998  | Matthews ................. 73/504.04 |
| 6,647,785 | B1 | * | 11/2003 | Stewart et al. ........... 73/504.13 |
| 6,928,874 | B1 | * | 8/2005  | Painter et al. ........... 73/504.13 |
| 6,934,660 | B1 | * | 8/2005  | Painter et al. .............. 702/141 |

* cited by examiner

*Primary Examiner*—Helen Kwok
(74) *Attorney, Agent, or Firm*—Daniel L. Dawes; Myers Dawes Andras & Sherman LLP

(57) ABSTRACT

A sensor is fabricated with micron feature sizes capable of simultaneously measuring absolute angles of rotation and angular rotational rates. The measurements are made directly from the position and velocity of the device without the need for electronic integration or differentiation. The device measures angle directly, avoiding the integration of electronic errors and allowing for higher performance in attitude measurement. These performance improvements and flexibility in usage allow for long term attitude sensing applications such as implantable prosthetics, micro-vehicle navigation, structural health monitoring, and long range smart munitions. Through the fabrication of the device using lithographic methods, the device can be made small and in large qualities, resulting in low costs and low power consumption.

26 Claims, 11 Drawing Sheets

METHOD OF SIMULTANEOUSLY AND DIRECTLY GENERATING AN ANGULAR POSITION AND ANGULAR VELOCITY MEASUREMENT IN A MICROMACHINED GYROSCOPE

RELATED APPLICATIONS

The present application is related to U.S. Provisional Patent Application Ser. No. 60/527,419, filed on Dec. 4, 2003, which is incorporated herein by reference and to which priority is claimed pursuant to 35 USC 119.

BACKGROUND OF THE INVENTION

1. Field of the Invention

The invention is in the field of MEMS gyroscopes capable of simultaneous measurement of angular position and angular rate.

2. Description of the Prior Art

All micromachined gyroscopes are vibratory in nature, measuring either angular rates by detecting energy coupled between orthogonal vibration modes due to Coriolis force or angle of rotation through the precession of an oscillation pattern. In a rate gyroscope, a structural element is forced into oscillation in one principle structural mode, designated the "drive" mode. The presence of rotation induced Coriolis force couples the sustained oscillation into an orthogonal structural mode, designated the "sense" mode. The magnitude of vibration induced in the sense mode is proportional to the rotation rate of the device.

However, these devices require integration of the electronic output signal to obtain orientation, magnifying drift and noise errors causing reduced performance. Prior work in the state of the art has produced a micromachined angle measuring gyroscope. However, the prior art control electronics of the gyroscope does not allow for the simultaneous detection of angular position and angular velocity. At present, no micromachined angle measuring devices exist on the market since designers are focused exclusively on the design of micromachined rate measuring gyroscopes. These devices require integration of the electronic output signal to obtain position, magnifying drift and noise errors which results in reduced performance.

BRIEF SUMMARY OF THE INVENTION

In the illustrated embodiment a sensor is fabricated with micron feature sizes capable of simultaneously measuring absolute angles of rotation and angular rotational rates. The measurements are made directly from the position and velocity of the device without the need for electronic integration or differentiation.

The gyroscope of the invention measures angle directly, avoiding the integration of electronic errors and allowing for higher performance in attitude measurement. The capability to simultaneously measure angular rate allows flexibility for the end user who can use the device for rate and angle measurement without additional electronics. These performance improvements and flexibility in usage would allow for long term attitude sensing applications such as implantable prosthetics, micro-vehicle navigation, structural health monitoring, and long range smart munitions. Through the fabrication of the device using lithographic methods, the device can be made small and in large qualities, resulting in low costs and low power consumption.

The invention is an improvement in a method for controlling a micromachined gyroscope which is comprised of a substrate, a proof mass coupled to the substrate by an isotropic suspension such that the proof mass can move in any direction in a working plane, one or more drive electrodes configured to cause the proof mass to oscillate in the working plane in a precessing elliptical path, and one or more sense electrodes configured to sense the motion of the proof mass in the working plane. The improvement comprises the steps of measuring the angle of precession of the elliptical path in the working plane from which an angle of rotation of the gyroscope is determined or is inversely equivalent and simultaneously measuring the angular rate of rotation of the gyroscope.

The steps of measuring the angle of precession or angle of rotation of the gyroscope and simultaneously measuring the angular rate of rotation of the gyroscope comprise measuring the position and the velocity of the proof mass in the working plane and generating the angle of precession and the angular rate of rotation of the gyroscope therefrom.

More specifically, the step of generating the angle of precession or angle of rotation of the gyroscope comprises generating an angle of precession signal according to:

$$\phi = \frac{1}{2}\tan^{-1}\left[\frac{2(\omega_n^2 xy + \dot{x}\dot{y})}{\omega_n^2(x^2 - y^2) + (\dot{x}^2 - \dot{y}^2)}\right] = -\Omega$$

where x and y are the position of the proof mass in the working plane, $\dot{x}$ and $\dot{y}$ are the velocity of the proof mass in the working plane, $\omega_n$ is the natural frequency of the gyroscope, where $\phi$ is the angle of precession and where $\Omega$ is the angle of rotation of the gyroscope.

The step of measuring the angular rate of rotation of the gyroscope comprises the steps of generating an angular momentum signal of the proof mass from the position and velocity of the proof mass in the working plane, synchronously demodulating the angular momentum signal, filtering the demodulated angular momentum signal to remove all frequencies higher than the fundamental frequency of the gyroscope, and generating a signal corresponding to the angular rate of rotation of the gyroscope according to $$\frac{-2H^*\omega_n^2}{E} = |\Omega|\cos\omega_q$$

where $H^*$ is the demodulated angular momentum signal, $\omega_n$ is the natural frequency of the gyroscope, E is the mass normalized energy of the gyroscope as a function of the position and velocity of the proof mass and $\omega_n$ the natural frequency, and $\omega_q$ is the frequency of sensed rotation and where $\omega_q \ll \omega_n$ and where $H^* \ll E$.

In the illustrated embodiment, the steps of measuring the angle of rotation of the gyroscope comprises the step of generating the generating an angle of precession signal in analog hardware, although the invention also contemplates digitally performing each of the method steps as well.

In the same manner in the illustrated embodiment, steps of generating an angular momentum signal of the proof mass from the position and velocity of the proof mass in the working plane, synchronously demodulating the angular momentum signal, filtering the demodulated angular momentum signal to remove all frequencies higher than the fundamental frequency of the gyroscope, and generating a signal corresponding to the angular rate of rotation of the gyroscope comprise the steps of generating an angular momentum signal in analog hardware, synchronously demodulating the angular momentum signal in analog hardware, filtering the demodulated angular momentum signal in analog hardware, and generating a signal corresponding to the angular rate of rotation of the gyroscope in analog hardware, although again the invention also contemplates digitally performing each of the method steps as well.

In the illustrated embodiment the step of sensing the position and velocity of the proof mass comprises the step capacitively sensing the position and velocity of the proof mass.

The invention can be alternatively defined as an improvement in a method for controlling a MEMS gyroscope comprised of vibrational lumped mass system rigidly attached to a substrate via suspension members which are attached to a proof mass on one end and anchored to the substrate through the anchors, the suspension members allowing isotropic compliance of movement of the proof mass within a working plane while restricting motion along an axis of rotation, electrostatic forces being used for the vibrational actuation of the gyroscope by means of fixed electrodes wherein position and velocity of the proof mass are detected by an output current induced by the motion of the gyroscope. The improvement comprises the step of driving the gyroscope in a mode where the equations of state for detected positions of the proof mass as a function of time form an elliptical orbit which is characterized after time averaging by orbital parameters including an inclination $\phi$ of the elliptical path from a fixed inertial reference frame wherein the rate change of the inclination $\phi$ is physically equal and opposite to the input rotation $\Omega$ of the gyroscope $$\dot{\phi} = -\Omega$$

and where the magnitude of the inclination $\phi$ is physically equal to the negative angle of rotation of the gyroscope $$\phi = -\int_0^t \Omega dt.$$

The improvement may then be defined as further comprising the step of measuring the angle of rotation of the gyroscope or angular inclination $\phi$ of the gyroscope by measuring the detected position and velocity of the proof mass and generating $\phi$ according to:

$$\tan 2\phi = \frac{2(\omega_n^2 xy + \dot{x}\dot{y})}{\omega_n^2 (x^2 - y^2) + (\dot{x}^2 - \dot{y}^2)}$$

The improvement is still further defined as comprising the step of measuring the angular velocity $\Omega$ of the gyroscope by measuring the detected position and velocity of the proof mass and generating $\Omega$ according to $$\frac{-2H^* \omega_n^2}{E} = |\Omega| \cos \omega_q$$

where $\omega_n$ is the natural frequency of the proof mass, $\omega_q$ is the input frequency applied to the gyroscope, where H* is the mass normalized angular momentum which as been demodulated at by multiplying by $\cos 2\omega_n t$ and removing all high frequency components above a predetermined cutoff frequency, so that $$H^* = -\frac{(a^2 - b^2)|\Omega|}{4} \cos \omega_q \text{ where } (a^2 - b^2) = \frac{2}{\omega_n^2} E$$

$$E = \frac{\omega_n^2 (x^2 + y^2) + (\dot{x}^2 + \dot{y}^2)}{2}$$

where E is the normalized system conserved energy, thus resulting in an angular rate $\Omega$ given by $$\frac{-2H^* \omega_n^2}{E} = |\Omega| \cos \omega_q.$$

It is also expressly understood that the invention includes within its scope also the apparatus in which the above improved methodologies are performed.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIG. 1a shows a z-axis integrating gyroscope design and FIG. 1b shows an x/y rate integrating gyroscope design. Each device comprises a mass-spring system vibrating along an elliptical trajectory in a "working" plane orthogonal to the desired sense axis. The devices are actuated through electrostatic force by applying voltages between the fixed electrodes and the proof mass.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1A:
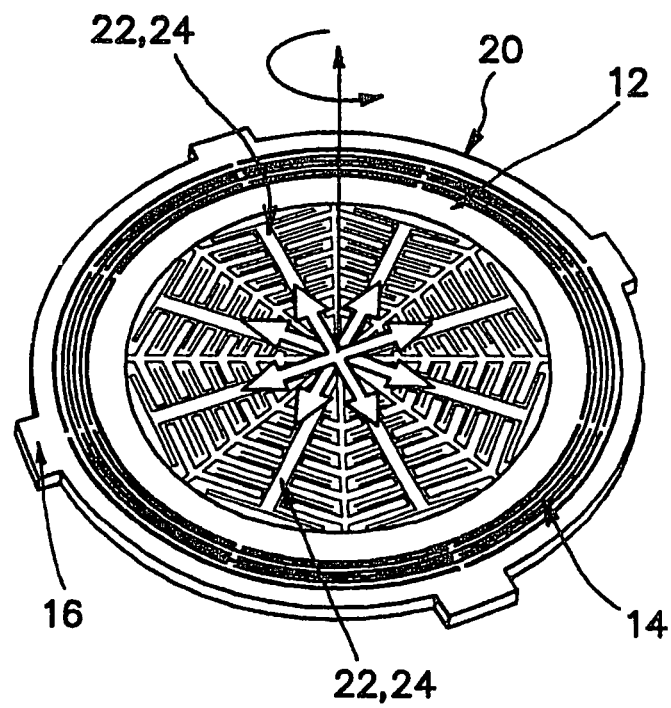
FIGS. 1a and 1b are perspective diagrammatic depictions of gyroscopes developed according to the invention to facilitate a full three degree of sensing attitude system.
Figure 1B:
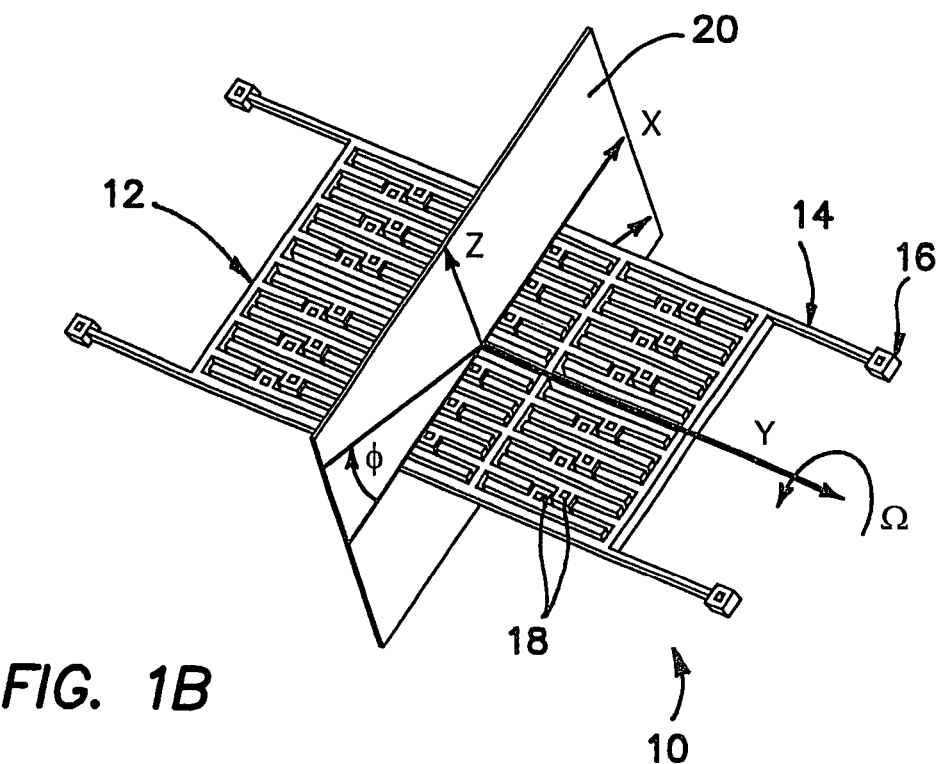

Possible realizations of x, y, and z gyroscopes 10 are shown in FIGS. 1*a* and 1*b*. The micromachined gyroscopes 10 each utilize a vibrational "lumped mass system "rigidly attached to the chip or substrate on which gyro 10 is ultimately mounted (not shown) via suspension members 14 which are attached to the proof mass 12 on one end and anchored to the chip substrate through anchors 16 on the other. The suspension members 14 are designed to allow compliance within the "working plane" 20 while restricting motion along the axis of rotation. In addition, it is necessary for suspension members 14 to be isotropic within the "working plane" 20 in order to allow the unperturbed precession of the oscillation pattern. Electrostatic forces are used for the actuation of the gyro 10. Actuation in this way is performed by application of DC and AC voltages on the fixed electrodes 18 of the gyros 10. Similarly, position and velocity are detected by output current induced by the motion of the gyro 10.

The structure of the gyros 10 of FIGS. 1*a* and 1*b* are substantially similar to that described in U.S. Pat. No. 6,481,285, assigned to the same assignee of the present invention, which patent is hereby incorporated by reference. The essential elements of the structure of the gyro 10 as described in the incorporated specification is a micro-machined angle measurement gyroscope comprising: a substrate (not shown); a proof mass 12 coupled to the substrate by an isotropic suspension 14 such that the proof mass 12 can move in any direction in the plane of the substrate; a plurality of drive electrodes 22 configured to cause the proof mass 12 to oscillate in a working plane 20 orthogonal to the sensed rotation; and a plurality of sense electrodes 24 configured to sense the motion of the proof mass 12 in the plane of the substrate. The plane of the substrate is in the plane of the circular array of gyroscope 10 of FIG. 1*a* and in the plane of the rectangular array of FIG. 1*b*. The working plane 20 of the embodiment of FIG. 1*a* is parallel to the plane of the array or substrate, while in the embodiment of FIG. 1*b* it is perpendicular to the plane of the array or substrate.

What is new to the present invention is the improvement in the control means and methodology where the device simultaneously measures angular position and angular rate.

Gyroscope Principles

Figure 2A:
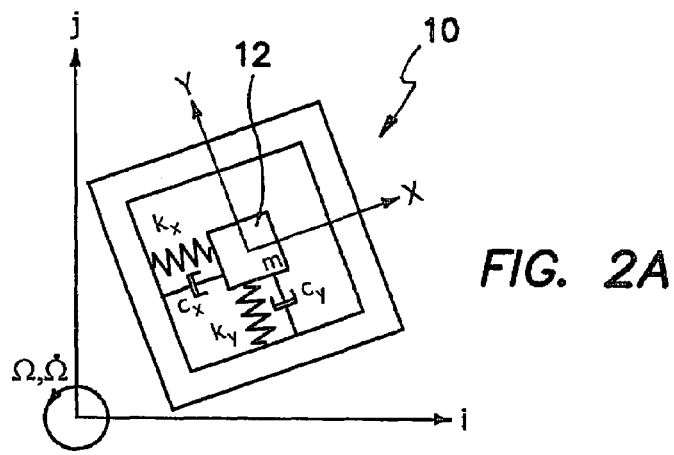
FIG. 2a is a diagram showing how the gyroscope is modeled as a two degree of freedom lumped mass-spring system. {i, j, k} is the inertial coordinate system and {x, y, z} is the coordinate system attached to the rotating platform.
Figure 2B:
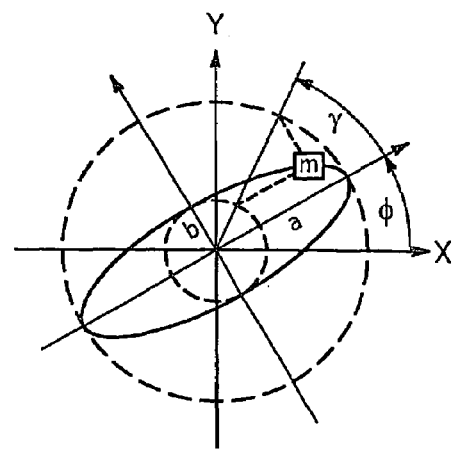
FIG. 2b is a diagram that shows in the absence of rotation, the mass trajectory is an ellipse with semi-major axis length a, semi-minor axis b, inclination angle $\phi$, and orbital angle $\gamma$.

The proposed rate and rate integrating gyroscope 10 can be modeled as a lumped mass-spring system operating in its first two fundamental in-plane modes as illustrated in the diagram of FIG. 2*a*. Proof mass 12 of gyroscope 10 vibrates or oscillates in the x-y plane of the depiction of FIG. 2*a* while gyroscope 10 or the x-y frame as a whole or collectively rotates due to external forces or rotations which are to be measured around an axis perpendicular to the plane of FIG. 2*a*. The inertial frame of reference can be considered to the lumped mass-spring dynamics of an ideal system are expressed in the rotating coordinate frame (X, Y) by equations $$\ddot{x}+\omega_n^2 x - 2\Omega\dot{y}=0$$

$$\ddot{y}+\omega_n^2 y + 2\Omega\dot{x}=0 \quad (1)$$

where x and y are deflections along the X and Y axis, respectively, $\omega_n$ is the natural frequency, and $\Omega$ is the input angular velocity. In a non-rotating system ($\Omega=0$), the solution is an ellipse of semi-major axis length a, semi-minor axis length b, and oriented at an angle $\phi$ from the X-Y axes as depicted in FIG. 2*b*. A convenient way of expressing the trajectory of the system is using these elliptical "orbital" variables (a, b, and $\phi$) which are common in orbital and celestial mechanics. If the ellipse is oriented with the X-Y axes, the solution can be expressed by equation #2

$$x=a\cos(\omega_n t+\gamma_0)$$

$$y=b\sin(\omega_n t+\gamma_0) \quad (2)$$

where $\gamma_0$ defines the initial" orbital angle" y, designating the starting point of the mass on the ellipse. Angle $\phi$ accounts for the orientation of the ellipse, giving the complete generalized elliptical equations #3 as $$x=a\cos\phi\cos\theta - b\sin\phi\sin\theta$$

$$y=a\sin\phi\cos\theta + b\cos\phi\sin\theta$$

$$\dot{x}=-\omega_n a\cos\phi\sin\theta - \omega_n b\sin\phi\cos\theta$$

$$\dot{y}=-\omega_n a\sin\phi\sin\theta + \omega_n b\cos\phi\cos\theta \quad (3)$$

where $$\theta=\omega_n t+y_0$$

Based off the position and velocity, the orientation angle can be directly calculated by equation #4

$$\tan 2\phi = \frac{2(\omega_n^2 xy + \dot{x}\dot{y})}{\omega_n^2(x^2-y^2)+(\dot{x}^2-\dot{y}^2)} \quad (4)$$

While the positions x and y are changing very quickly over one period of oscillation (about 10,000 vibrations per second), the orbital parameters a, b, and $\phi$ remain nearly constant over one period.

Thus, averaging techniques may be implemented to approximate the long term behavior of the slowly varying orbital parameters. This technique is useful in evaluating the effect of perturbations on the gyroscopic system. In the interest of space, a terse background is presented, a more general explanation of this technique can be found in I. V. Novozhilov. *Fractional Analysis: Methods of Motion Decomposition*. Birkhaeuser, Boston, Mass., 1997 and in the scope of gyroscopic systems in B. Friedland and M. Hutton, Theory And Error Analysis Of Vibrating-Member Gyroscope, *IEEE Transactions on Automatic Control*, AC-23(4): 545–556, 1978 and V. F. Zhuravlev. Oscillation shape control in resonant systems. *J. Appl. Maths Mechs.*, 56(5): 725–735, 1992.

The initial dynamic system in Equation #1 can be presented in state form as equation #5

$$\dot{u} = -Au + f(u) \tag{5}$$

where u=(x, y, dx/dt, dy/dt) and f(u) are small perturbations such as Coriolis force, anisoelasticity, and damping. The homogeneous solution when f(u)=0 is given by equation #6

$$u = g(z,t) \tag{6}$$

where $z = \{a, b, \phi, \gamma_o\}$ is an array of initial condition determined constants. To solve for the particular solution, we use variation of parameters where $z=z(t)$. Differentiating Equation #6 gives $$\dot{u} = \dot{g} + J\dot{z}$$

$$J = \frac{\partial g}{\partial z}$$

Using the fact that dg/dt=Ag and substituting back into Equation #5 gives $$\dot{z} = J^{-1} h(z,t)$$

$$h = f(g(z,t))$$

Time averaging over one period of oscillation T yields $$z \approx \frac{1}{T} \int_0^T J^{-1} h(z, t) dt$$

$$T = \frac{2\pi}{\omega_n}$$

Prior to time averaging, the state equations are given as $$\dot{a} = -\Omega b \sin 2\gamma \tag{7}$$

$$\dot{b} = \Omega a \sin 2\gamma$$

$$\dot{\phi} = \frac{2\Omega}{(a^2 - b^2)} (b^2 \cos^2\gamma - a^2 \sin^2\gamma)$$

$$\dot{\gamma} = \omega_n - \frac{2\Omega ab \cos 2\gamma}{(a^2 - b^2)}$$

Under time averaging and assuming that the ellipse is kept very thin to minimize anisoelasticity effects, the orbital state equations can be expressed as $$\dot{a} = 0$$

$$\dot{b} = 0$$

$$\dot{\phi} = -\Omega$$

$$\dot{\gamma} \omega_n$$

Figure 2C:
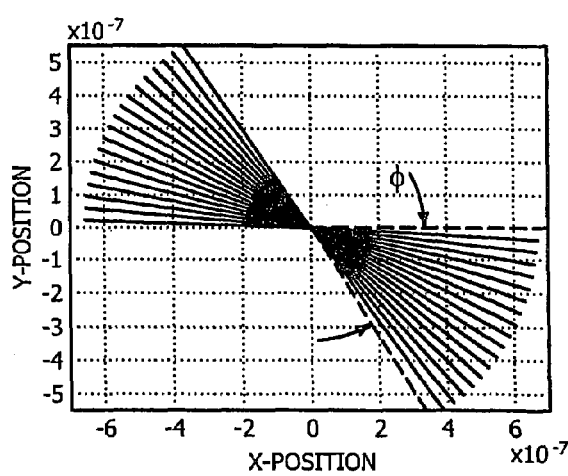
FIG. 2c is a graph of the y and x positions which shows that with an input angular velocity, the line of oscillation precesses, giving a measure of the angular position of the device.

Thus, we see that when the device 10 is rotated at a constant velocity 0, the vibration pattern will precess with the same angular velocity, but in the opposite direction with respect to a viewer in the moving frame as depicted in FIG. 2c. Assuming the oscillation pattern initially coincides with the X-Y coordinate system ($\phi=0$), the inclination of the ellipse $\phi$, which can be found at any given time by equation #4, is exactly equal to the negative angle of rotation of the device 10

$$\phi = -\int_0^t \Omega dt \tag{9}$$

A device operating on these principles mechanically integrates any input angular rate and an output angular displacement can be resolved without integrating any electronic signals.

An important property is that even if $\Omega$ varies in time, Equation #9 is still valid. Since Equation #9 is twice differentiable, it can be observed that the angular acceleration $d\Omega/dt$ of the vibration pattern precession is equal to the negative angular acceleration of the device 10. Thus, the calculated precession angle is invariant to changes in the angular rate. This important property has also been observed in vibrating shells. In the designed device, the position (x, y) and velocity (dx/dt, dy/dt) are measured and used to calculate the angular position and angular velocity.

Measurement of Angular Position

As seen in the above equations, the angle can be directly identified from the position and velocity of the device by $$\tan 2\phi = \frac{2(\omega_n^2 xy + \dot{x}\dot{y})}{\omega_n^2 (x^2 - y^2) + (\dot{x}^2 - \dot{y}^2)} \tag{10}$$

Figure 4:
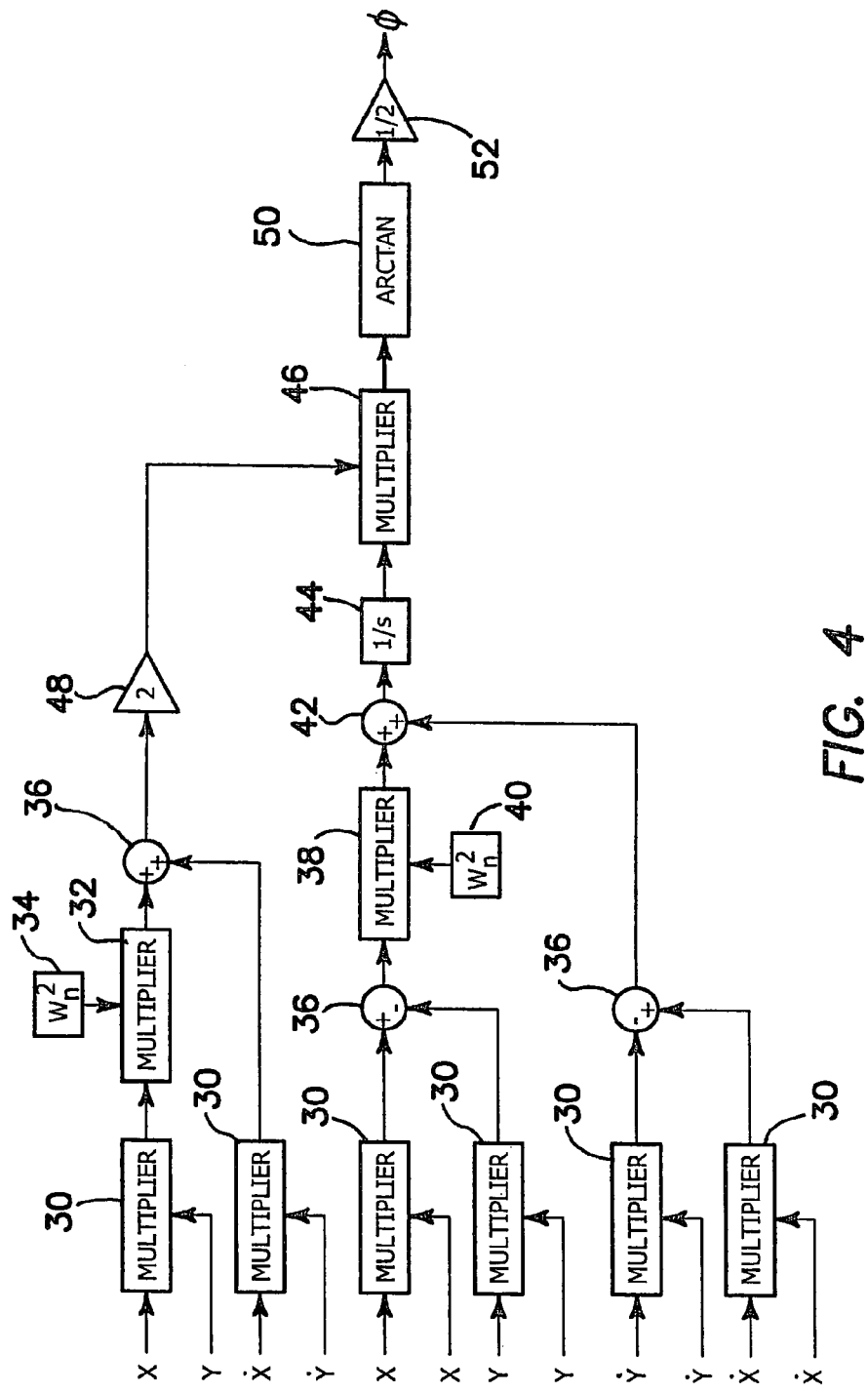
FIG. 4 is a schematic of an angular pickoff control circuit or methodology.

The sensing mechanism may vary from device to device, but typically capacitive pickoff will be used. The control flow diagram for measurement of the angular position based exclusively off the measured position and velocity is shown in FIG. 4 which is the graphic equivalent of computing $\phi$ from equation #10. The appropriately oriented sensing electrodes 24 generate raw data signals for x and y as a function of time. Time differentiators may generate dx/dt and dy/dt. The position and velocity signals are coupled to multipliers 30 to conform to equation #10 to generate signals which are the squares of the positions and velocities and the cross products of the positions and velocities. The signal corresponding to the position cross product, xy, is multiplied in multiplier 32 by a stored value for $\omega_n^2$ symbolically depicted by storage element 34. The appropriate groupings of products according to equation #10 are summed or differenced in adders 36 according to equation #10. The difference $x^2-y^2$ is multiplied in multiplier 38 by a stored value for $\omega_n^2$ symbolically depicted by storage element 40. The signal corresponding to the squares of the position and velocity are then summed in adder 42, inverted in inverter 44 and multiplied in multiplier 46 with the doubled output of adder 36 through amplifier or constant multiplier 48. The output of multiplier 46 is processed by an arctan converter 50 and divided by amplifier or constant divider 52 to yield the precession angle, $\phi$ according to equation #10.

Measurement of Angular Velocity

At any given point, the change in mass normalized angular momentum is given as $$\dot{H} = \Omega(a\dot{b} + \dot{a}b) \tag{11}$$

Substituting values from Equation #7 gives the change in angular momentum as $$\dot{H} = \omega_n \Omega (a^2 - b^2) \sin 2\omega_n t \quad (12)$$

In the case of an input sinusoidal signal, for example, the angular velocity Q is a function of a time given as $$\Omega = |\Omega| \cos \omega_q t \quad (13)$$

If the input angular velocity is much less than the natural frequency of the device ($\omega_q \ll \omega_n$) then substituting (13) into (12) and integrating gives $$H = \frac{(a^2 - b^2)|\Omega|}{2}(1 - \cos \omega_q \cos 2\omega_n) = x\dot{y} - y\dot{x} \quad (14)$$

(where H is initially assumed to be zero. Next, we perform synchronous demodulation by multiplying the angular momentum by $\cos 2\omega_n t$ and passing through a low pass filter to remove the higher frequency components. The demodulated and filter signal H* is given as $$H^* = -\frac{(a^2 - b^2)|\Omega|}{4} \cos \omega_q \quad (15)$$

This can be related directly to the position and velocity of the mass by $$\frac{-2H^* \omega_n^2}{E} = |\Omega| \cos \omega_q \quad (16)$$

where $$(a^2 - b^2) = \frac{2}{\omega_n^2} E \quad (17)$$

$$E = \frac{\omega_n^2(x^2 + y^2) + (\dot{x}^2 + \dot{y}^2)}{2} \quad (18)$$

Here it assumed that the mass normalized system energy E is much larger than the mass normalized angular momentum H. As the overall system energy E is constant during operation, the angular velocity can be obtained at instantaneous moment from measurements of the position (x, y) and velocity (dx/dt, dy/dt) of the device 10.

Figure 5:
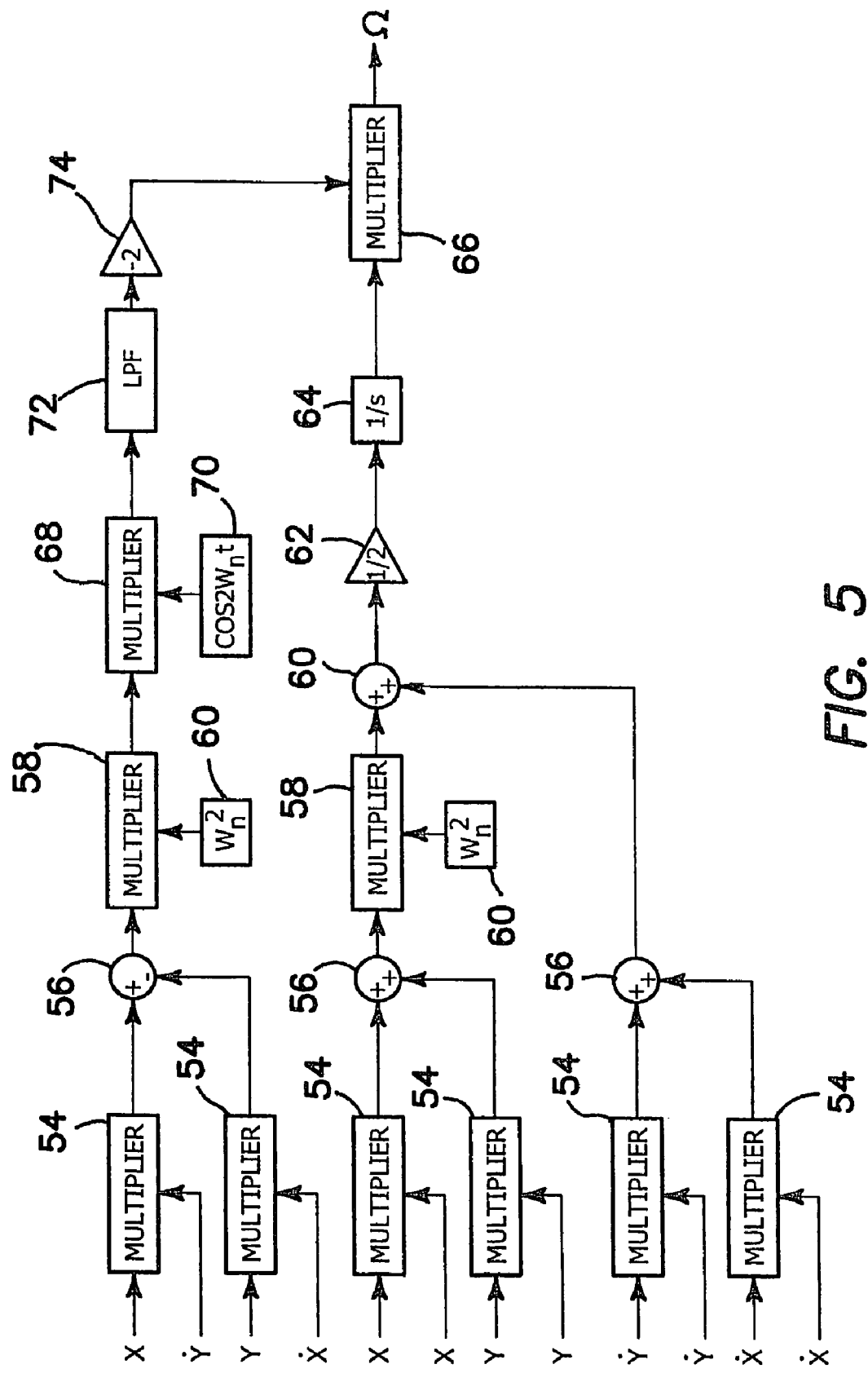
FIG. 5 is a schematic of an angular rate pickoff control circuit or methodology.

The control flow diagram for measurement of the angular velocity based exclusively off the measured position and velocity is shown in the diagram of FIG. 5 which is the computational sequence of equations #16 and 18. The positions and their velocities are directly measured and generated by differentiators (not shown) and input into multipliers 54 according to equations #16 and 18. Their respective squares are output by multipliers 54 and coupled to adders 56 according to equations #16 and 18. Certain ones of the sums from adders 56 are then multiplied in multipliers 58 by a parameter value for $\omega_n$ symbolically depicted as stored or input from element 60. In the case of the denominator of equation #16 it is added in adder 60 to a sum of squares of the velocities, divided by an amplifier or constant divider 62, inverted by inverter 64 and provided as one input to multiplier 66. In the meantime, the second harmonic signal, $\cos 2\omega_n t$ from generator 70 is coupled to multiplier 68 to demodulate the output of multiplier 58. All frequencies above the fundamental frequency $\omega_n$ are removed by low pass filter 72, whose output is then multiplied by −2 by an inverting amplifier or constant multiplier 74 to be provided as the second input to multiplier 66 as the numerator of equation #16. The output of multiplier 66 is the sensed angle rate, Ω.

Simulation of the Design

Figure 3:
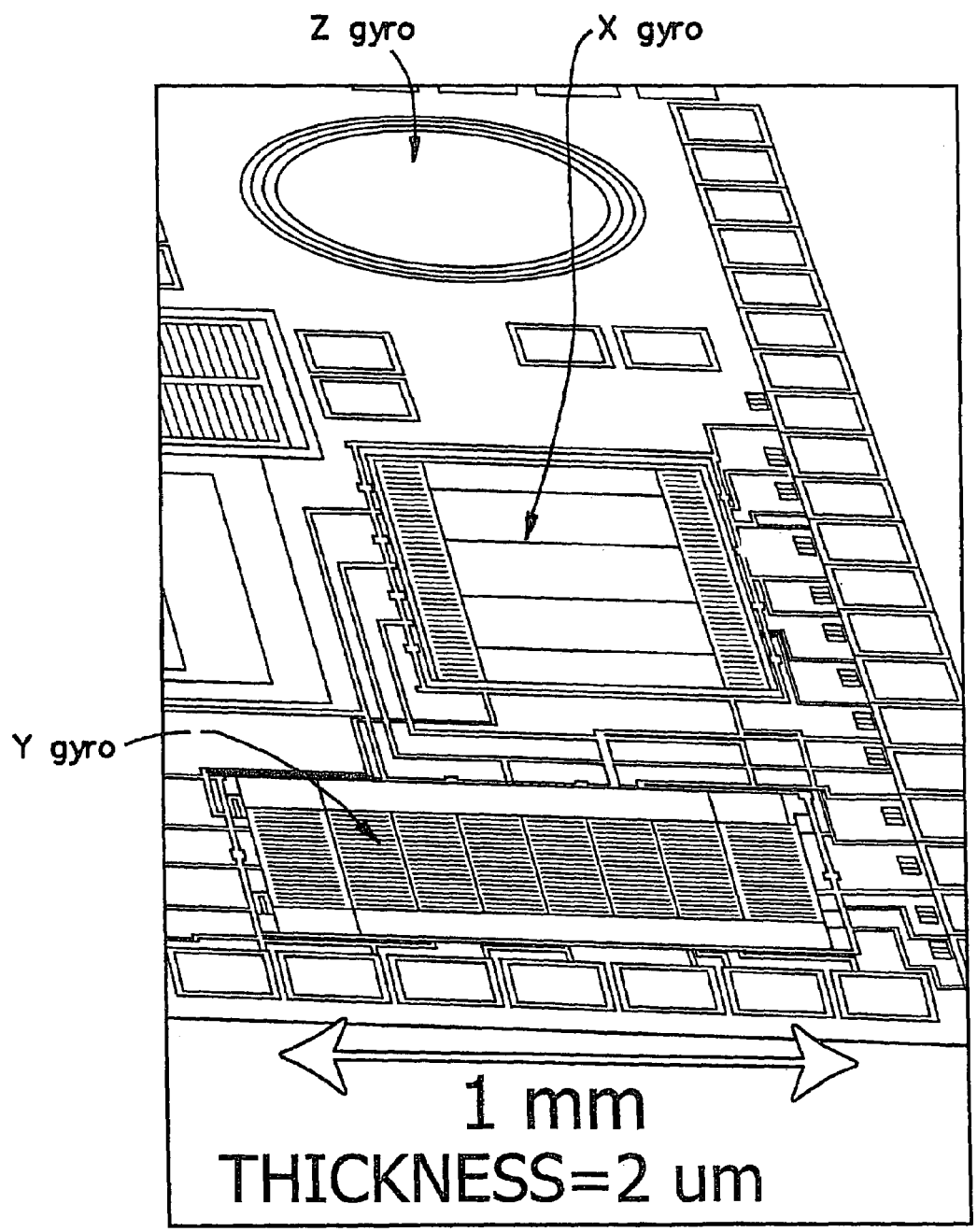
FIG. 3 is a microphotograph of a gyroscope which combines the designs of FIGS. 1a and 1b in a three axis gyroscope.

Existing gyroscope designs as shown in the photograph of FIG. 3 conceived by the inventors are used as a test bed to demonstrate the performance of the control architecture. FIG. 3 is a microphotograph of a three-axis gyro 10 in which one circular gyro 10 of the form of FIG. 1a is combined with two orthogonally oriented rectangular gyros 10 of the form of FIG. 1b. The mass of the device is 4.10×10−10 kg and the isotropic stiffness $k_n$ is 5.0 N/m, giving a natural frequency of 17.6 kHz for the system. The entire model is shown in FIGS. 6, 7, 8, and 9.

Figure 6:
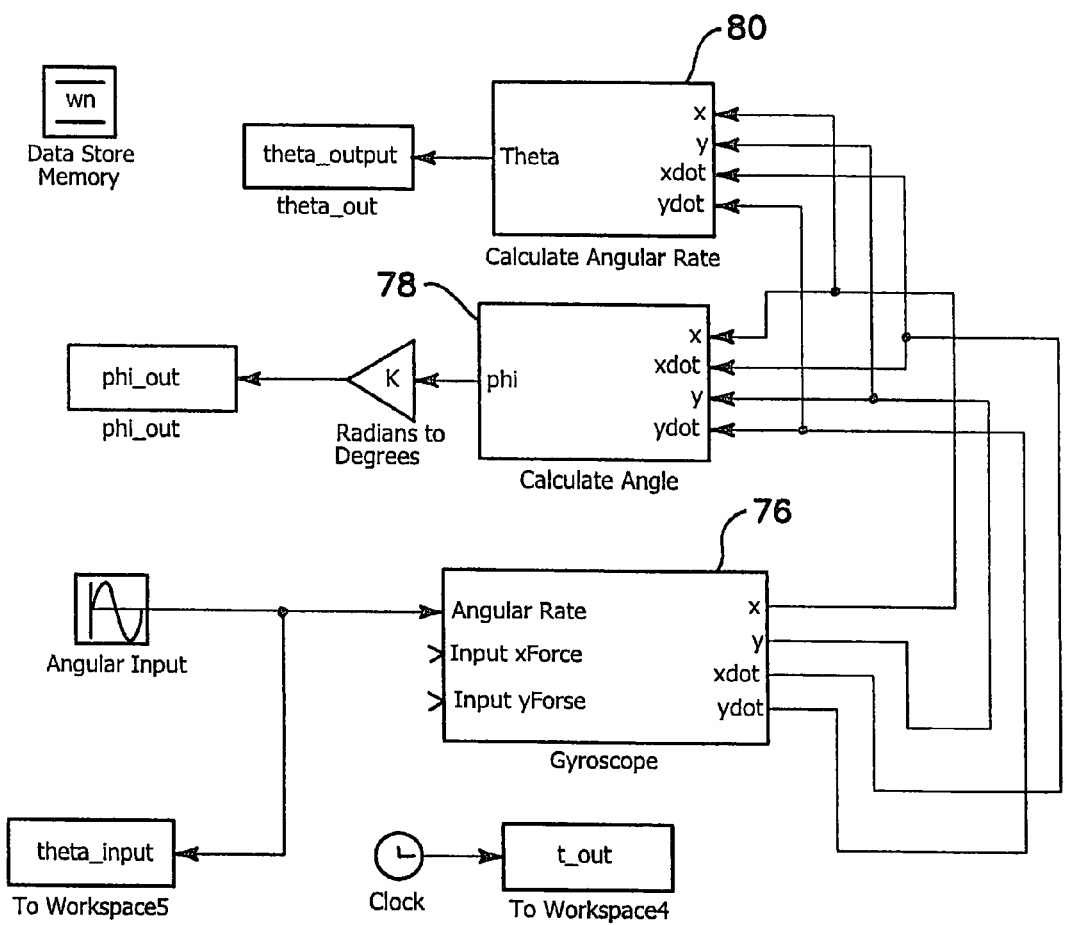
FIG. 6 is a schematic of a full simulink model.
Figure 7:
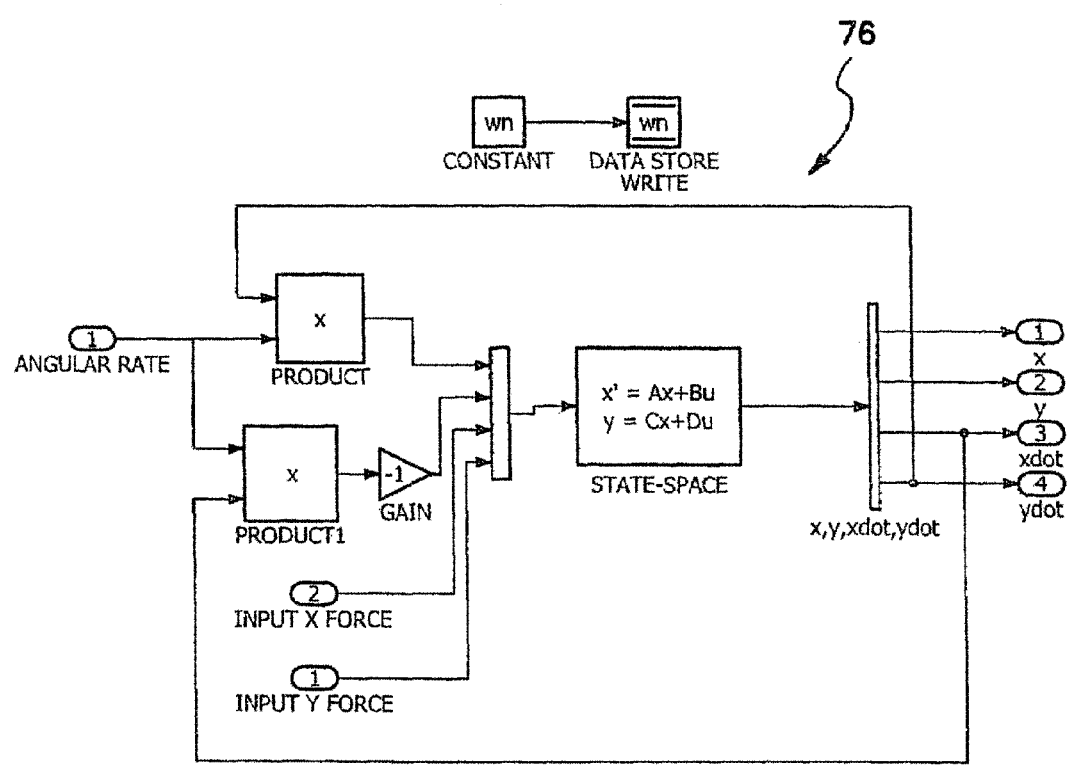
FIG. 7 is a schematic of a gyroscope subsystem.

Existing gyroscope designs as shown in FIG. 3 as conceived by the inventors are used as a test bed to demonstrate the performance of the control architecture. The mass of the device is 4.10×10−10 kg and the isotropic stiffness $k_n$ is 5.0 N/m, giving a natural frequency of 17.6 kHz for the system. The entire simulated model is shown in FIG. 6 where the input is a time varying angular rate and the output is both angular rate and angular position as measured by the device. The methodologies of the invention as summarized in the equations above are mathematically simulated in a computer program organized as illustrated in FIG. 6 and further depicted in FIGS. 7–9. The simulation is not material to the scope of the invention, but serves to verify the validity of the mathematic model on which the invention is based, and therefore will not be elaborated beyond the extent as disclosed below. This simulated model is broken down into the follow subsystems:

Gyroscope block 76 simulates the system dynamics where an input angular rate is processed and the resulting x and y positions and x and y velocities are output as illustrated in FIG. 7.

Figure 8:
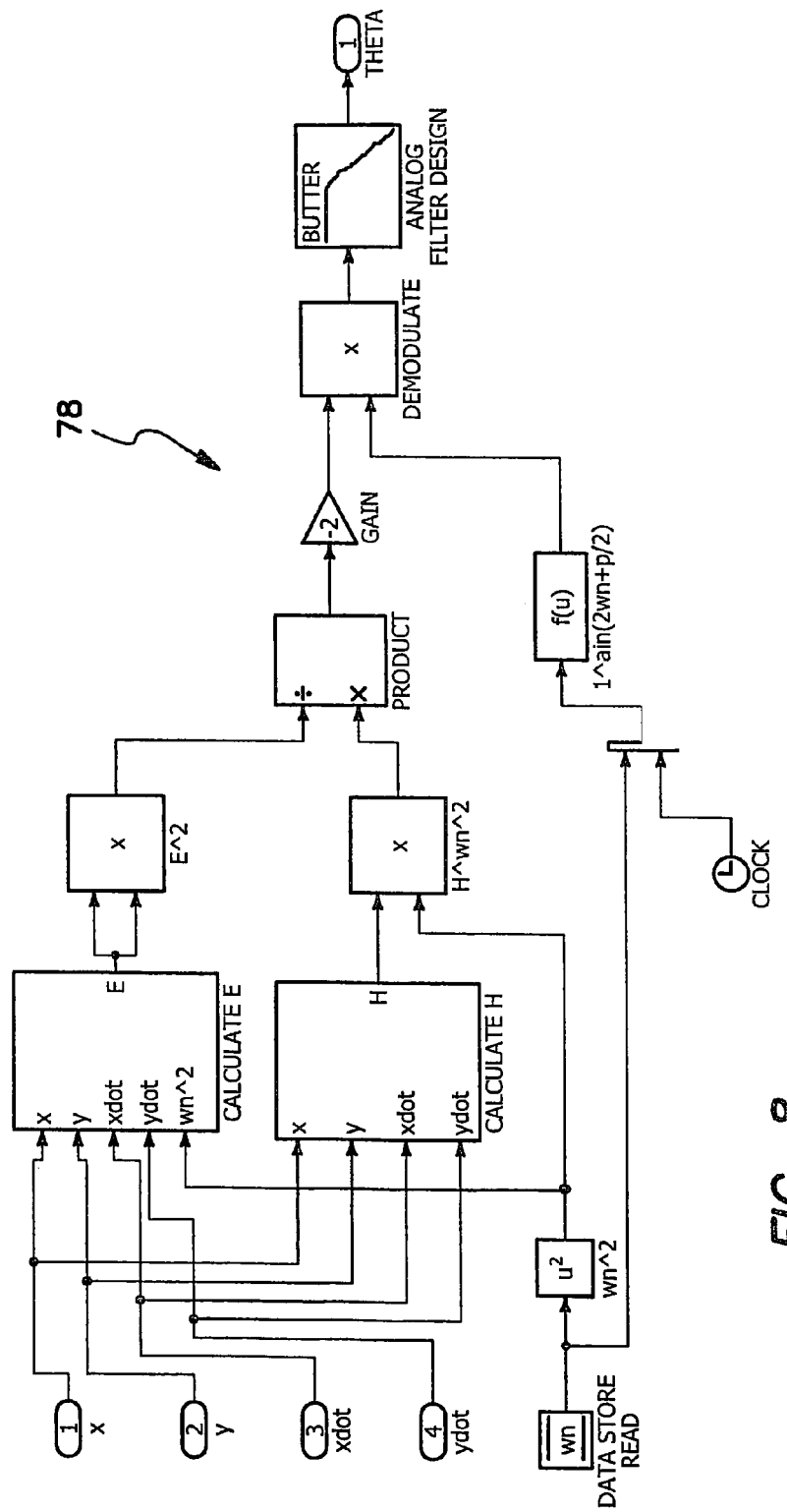
FIG. 8 is a schematic of an angular rate measurement subsystem.

CalculateAngularRate block 78 is illustrated in FIG. 8 and is where the x and y position and velocity outputs from the gyroscope block 76 are processed in order to calculate the angular rate of the device. The control structure is identical to the algorithms as presented above.

Figure 9:
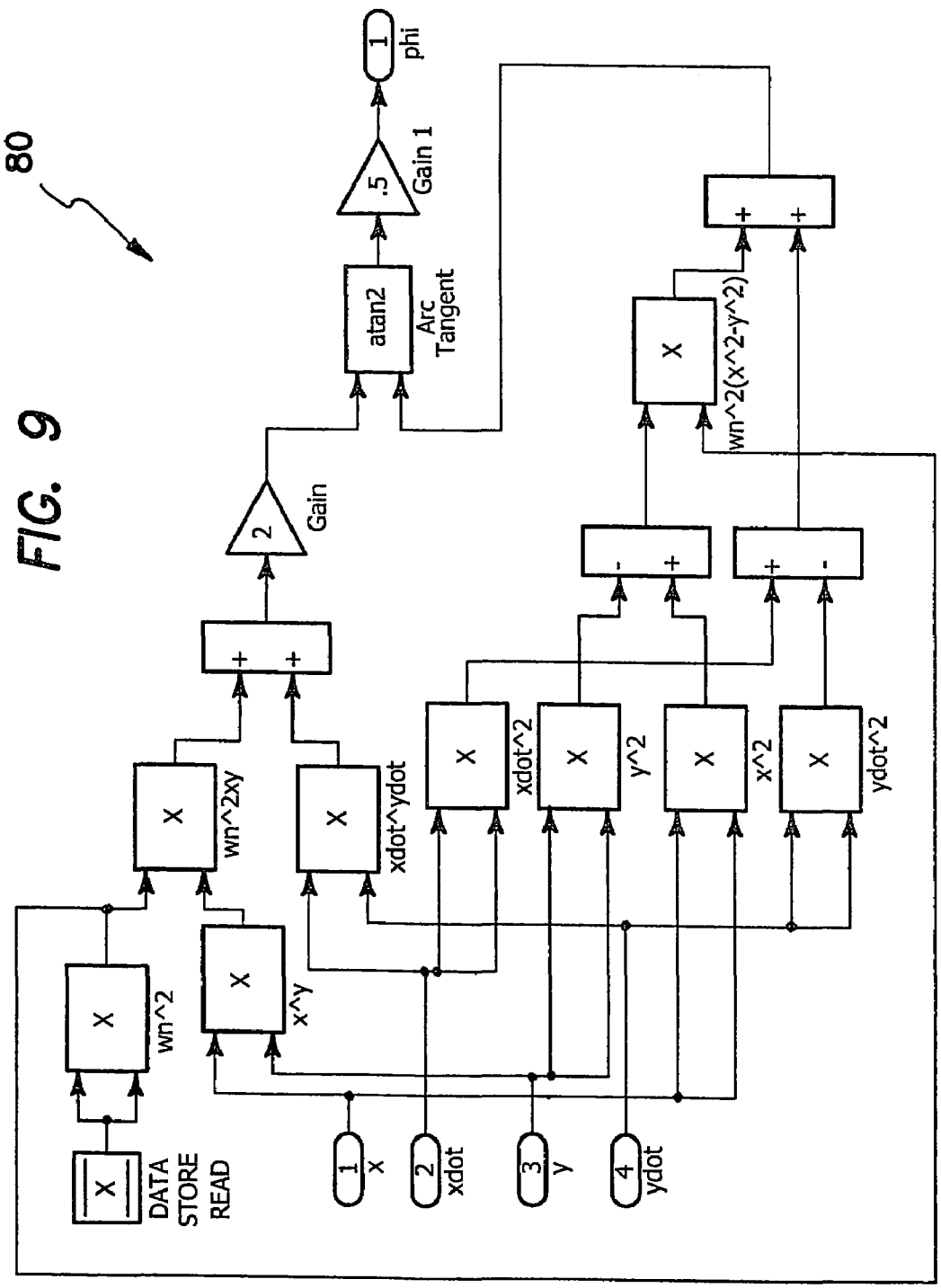
FIG. 9 is a schematic of an angular measurement subsystem.

CalculateAngle block 80 is illustrated in FIG. 9 and is where the x and y position and velocity measurements are processed in order to calculate the angular detection of the device. The control structure is identical to the algorithms as presented above.

Figure 10A:
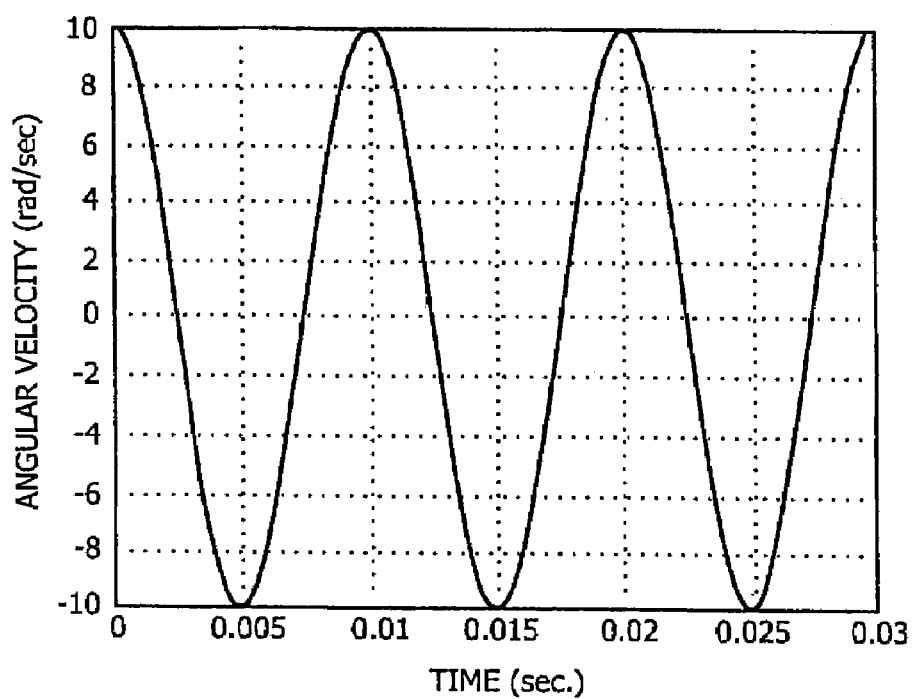
FIG. 10*a* is a graph of the input angular velocity as a function of time.
Figure 10B:
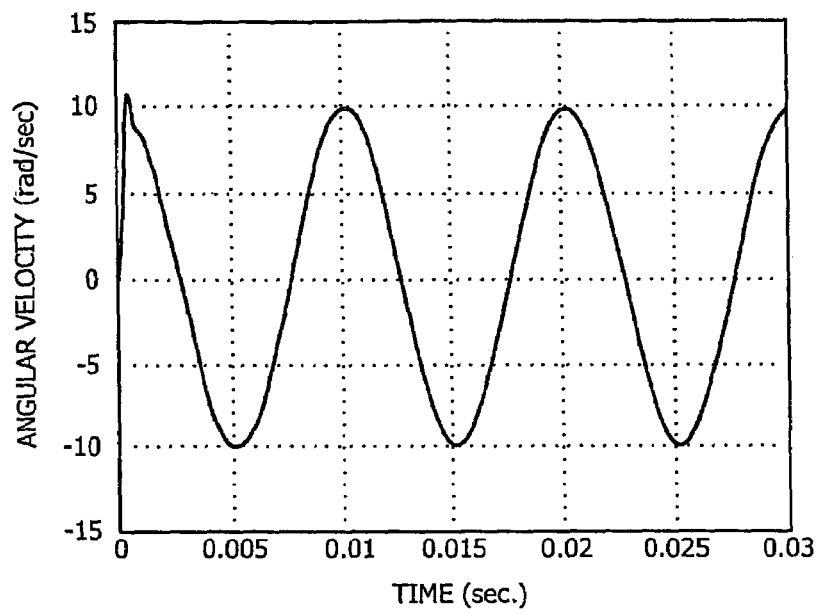
FIG. 10*b* is a graph of the measured output angular velocity as a function of time.
Figure 10C:
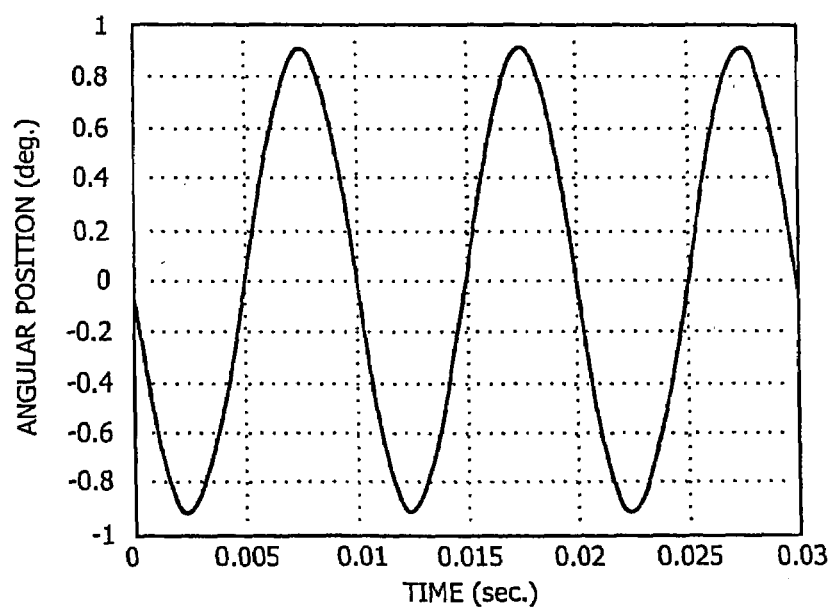
FIG. 10*c* is a graph of the measured precession angle precession angle (actual angle of rotation is the negative of the precession angle) as a function of time.

At startup, the device 10 is initially freely oscillating at its natural frequency. An angular velocity, theta input, whose waveform is shown in FIG. 10a, is inputted into the system. Plots of the output block variables, theta out, and phi out corresponding to the measured angular rate and angular position, respectively, are shown in FIGS. 10b and 10c. It is observed that the device 10 tracks the angular velocity very well with a slight phase lag due to the filter 72 used in the demodulation. The device 10 tracks the precession angle φ with no visible error.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification, as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for anyone of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An improvement in a method for controlling a micromachined gyroscope comprising a substrate, a proof mass coupled to the substrate by an isotropic suspension such that the proof mass can move in any direction in a working plane, one or more drive electrodes configured to cause the proof mass to oscillate in the working plane in a precessing elliptical path, and one or more sense electrodes configured to sense the motion of the proof mass in the working plane, the improvement comprising:
   measuring an angle of precession of the elliptical path in the working plane from which an angle of rotation of the gyroscope is determined; and
   simultaneously measuring the angular rate of rotation of the gyroscope.

2. The improvement of claim 1 where measuring the angle of precession or angle of rotation of the gyroscope and simultaneously measuring the angular rate of rotation of the gyroscope comprises measuring a position and a velocity of the proof mass in the working plane and generating the angle of precession and the angular rate of rotation of the gyroscope therefrom.

3. The improvement of claim 2 where generating the angle of precession or angle of rotation of the gyroscope comprises generating an angle of precession signal according to:

$$\phi = \frac{1}{2}\tan^{-1}\left[\frac{2(\omega_n^2 xy + \dot{x}\dot{y})}{\omega_n^2(x^2 - y^2) + (\dot{x}^2 - \dot{y}^2)}\right]$$
$$= -\Omega$$

where x and y are the position of the proof mass in the working plane, $\dot{x}$ and $\dot{y}$ are the velocity of the proof mass in the working plane, $\omega_n$ is the natural frequency of the gyroscope, where $\phi$ is the angle of precession and where $\Omega$ is the angle of rotation of the gyroscope.

4. The improvement of claim 2 where measuring the angular rate of rotation of the gyroscope comprises generating an angular momentum signal of the proof mass from the position and the velocity of the proof mass in the working plane, synchronously demodulating the angular momentum signal, filtering the demodulated angular momentum signal to remove all frequencies higher than the fundamental frequency of the gyroscope, and generating a signal corresponding to the angular rate of rotation of the gyroscope according to $$\frac{-2H^*\omega_n^2}{E} = |\Omega|\cos\omega_q$$

where H* is the demodulated angular momentum signal, $\omega_n$ is the natural frequency of the gyroscope, E is the mass normalized energy of the gyroscope as a function of the position and velocity of the proof mass and $\omega_n$ the natural frequency, and $\omega_q$ is the frequency of sensed rotation and where $\omega_q << \omega_n$ and where H*<<E.

5. The improvement of claim 3 where measuring the angle of rotation of the gyroscope comprises generating an angle of precession signal in hardware.

6. The improvement of claim 4 where generating an angular momentum signal of the proof mass from the position and the velocity of the proof mass in the working plane, synchronously demodulating the angular momentum signal, filtering the demodulated angular momentum signal to remove all frequencies higher than the fundamental frequency of the gyroscope, and generating a signal corresponding to the angular rate of rotation of the gyroscope comprises generating an angular momentum signal in hardware, synchronously demodulating the angular momentum signal in hardware, filtering the demodulated angular momentum signal in hardware, and generating a signal corresponding to the angular rate of rotation of the gyroscope in hardware.

7. The improvement of claim 1 where measuring the angle of precession and simultaneously measuring the angular rate of rotation of the gyroscope comprises sensing a position and a velocity of the proof mass generating signals corresponding to the position and the velocity of the proof mass and simultaneously generating the angle of rotation of the gyroscope and the rate of rotation of the angle of rotation of the gyroscope therefrom.

8. The improvement of claim 7 where sensing the position and the velocity of the proof mass comprises capacitively sensing the position and the velocity of the proof mass.

9. An improvement in a method for controlling a MEMS gyroscope comprised of vibrational lumped mass system rigidly attached to a substrate via suspension members which are attached to a proof mass on one end and anchored to the substrate through anchors, the suspension members allowing isotropic compliance of movement of the proof mass within a working plane while restricting motion along an axis of rotation, electrostatic forces being used for a vibrational actuation of the gyroscope by means of fixed electrodes wherein position and velocity of the proof mass are detected by an output current induced by the motion of the gyroscope, the improvement comprising:

driving the gyroscope in a mode where the equations of state for detected positions of the proof mass as a function of time form an elliptical orbit which is characterized after time averaging by orbital parameters including an inclination φ of the elliptical orbit from a fixed inertial reference frame wherein a rate change of the inclination φ is physically equal and opposite to an input rotation Ω of the gyroscope $$\dot{\phi} = -\Omega$$

and where the magnitude of the inclination φ is physically equal to the negative angle of rotation of the gyroscope $$\phi = -\int_0^t \Omega dt.$$

10. The improvement of claim 9 further comprising measuring an angle of rotation of the gyroscope or an angular inclination φ of the gyroscope by measuring the detected position and velocity of the proof mass and generating φ according to:

$$\tan 2\phi = \frac{2(\omega_n^2 xy + \dot{x}\dot{y})}{\omega_n^2(x^2 - y^2) + (\dot{x}^2 - \dot{y}^2)}$$

where x and y are the position of the proof mass in the working plane, $\dot{x}$ and $\dot{y}$ are the velocity of the proof mass in the working plane, $\omega_n$ is the natural frequency of the gyroscope.

11. The improvement of claim 9 further comprising measuring an angular velocity Ω of the gyroscope by measuring the detected position and velocity of the proof mass and generating Ω according to $$\frac{-2H^* \omega_n^2}{E} = |\Omega|\cos\omega_q$$

where $\omega_n$ is the natural frequency of the proof mass, $\omega_q$ is the input frequency applied to the gyroscope, where H* is the mass normalized angular momentum which as been demodulated at by multiplying by cos 2$\omega_n$t and removing all high frequency components above a predetermined cutoff frequency, so that $$H^* = -\frac{(a^2 - b^2)|\Omega|}{4}\cos\omega_q$$

where $$(a^2 - b^2) = \frac{2}{\omega_n^2}E$$

$$E = \frac{\omega_n^2(x^2 + y^2) + (\dot{x}^2 + \dot{y}^2)}{2}$$

where E is the normalized system conserved energy, thus resulting in an angular rate Ω given by $$\frac{-2H^* \omega_n^2}{E} = |\Omega|\cos\omega_q.$$

12. The improvement of claim 10 further comprising measuring an angular velocity Ω of the gyroscope by measuring the detected position and velocity of the proof mass and generating Ω according to $$\frac{-2H^* \omega_n^2}{E} = |\Omega|\cos\omega_q$$

where $\omega_n$ is the natural frequency of the proof mass, $\omega_q$ is the input frequency applied to the gyroscope, where H* is the mass normalized angular momentum which as been demodulated at by multiplying by cos 2$\omega_n$t and removing all high frequency components above a predetermined cutoff frequency, so that $$H^* = -\frac{(a^2 - b^2)|\Omega|}{4}\cos\omega_q$$

where $$(a^2 - b^2) = \frac{2}{\omega_n^2}E$$

$$E = \frac{\omega_n^2(x^2 + y^2) + (\dot{x}^2 + \dot{y}^2)}{2}$$

where E is the normalized system conserved energy, thus resulting in an angular rate Ω given by $$\frac{-2H^* \omega_n^2}{E} = |\Omega|\cos\omega_q.$$

13. The improvement of claim 12 where measuring the angular velocity Ω of the gyroscope is performed simultaneously with measuring the angle of rotation of the gyroscope or the angular inclination φ of the gyroscope.

14. An improvement in a micromachined gyroscope comprising a substrate, a proof mass coupled to the substrate by an isotropic suspension such that the proof mass can move in any direction in a working plane, one or more drive electrodes configured to cause the proof mass to oscillate in the working plane in a precessing elliptical path, and one or more sense electrodes configured to sense the motion of the proof mass in the working plane, the improvement comprising:

means for measuring an angle of precession of the elliptical path in the working plane or an angle of rotation of the gyroscope; and means for simultaneously measuring an angular rate of rotation of the gyroscope.

15. The improvement of claim 14 where the means for measuring the angle of precession or the angle of rotation of the gyroscope and the means for simultaneously measuring the angular rate of rotation of the gyroscope comprises means for measuring a position and a velocity of the proof mass in the working plane and generating the angle of precession and the angular rate of rotation of the gyroscope therefrom.

16. The improvement of claim 15 where the means for generating the angle of precession or the angle of rotation of the gyroscope comprises means for generating an angle of precession signal according to:

$$\phi = \frac{1}{2}\tan^{-1}\left[\frac{2(\omega_n^2 xy + \dot{x}\dot{y})}{\omega_n^2(x^2 - y^2) + (\dot{x}^2 - \dot{y}^2)}\right]$$
$$= -\Omega$$

where x and y are the position of the proof mass in the working plane, $\dot{x}$ and $\dot{y}$ are the velocity of the proof mass in the working plane, $\omega_n$ is the natural frequency of the gyroscope, where $\phi$ is the angle of precession and where $\Omega$ is the angle of rotation of the gyroscope.

17. The improvement of claim 15 where the means for measuring the angular rate of rotation of the gyroscope comprises means for generating an angular momentum signal of the proof mass from the position and the velocity of the proof mass in the working plane, means for synchronously demodulating the angular momentum signal, means for filtering the demodulated angular momentum signal to remove all frequencies higher than the fundamental frequency of the gyroscope, and means for generating a signal corresponding to the angular rate of rotation of the gyroscope according to $$\frac{-2H^*\omega_n^2}{E} = |\Omega|\cos\omega_q$$

where H* is the demodulated angular momentum signal, $\omega_n$ is the natural frequency of the gyroscope, E is the mass normalized energy of the gyroscope as a function of the position and velocity of the proof mass and $\omega_n$ the natural frequency, and $\omega_q$ is the frequency of sensed rotation and where $\omega_q << \omega_n$ and where H*<<E.

18. The improvement of claim 16 where the means for measuring the angle of rotation of the gyroscope comprises means for generating the generating an angle of precession signal in hardware.

19. The improvement of claim 17 where the means for generating an angular momentum signal of the proof mass from the position and the velocity of the proof mass in the working plane, the means for synchronously demodulating the angular momentum signal, the means for filtering the demodulated angular momentum signal to remove all frequencies higher than the fundamental frequency of the gyroscope, and the means for generating a signal corresponding to the angular rate of rotation of the gyroscope comprises means for generating an angular momentum signal in hardware, means for synchronously demodulating the angular momentum signal in hardware, means for filtering the demodulated angular momentum signal in hardware, and means for generating a signal corresponding to the angular rate of rotation of the gyroscope in hardware.

20. The improvement of claim 14 where the means for measuring the angle of precession and the means for simultaneously measuring the angular rate of rotation of the gyroscope comprises means for sensing a position and a velocity of the proof mass, means for generating signals corresponding to the position and the velocity of the proof mass and means for simultaneously generating the angle of rotation of the gyroscope and the rate of the angle of rotation of the gyroscope therefrom.

21. The improvement of claim 20 where the means for sensing the position and the velocity of the proof mass comprises means for capacitively sensing the position and the velocity of the proof mass.

22. An improvement in a MEMS gyroscope comprised of vibrational lumped mass system rigidly attached to a substrate via suspension members which are attached to a proof mass on one end and anchored to the substrate through anchors, the suspension members allowing isotropic compliance of movement of the proof mass within a working plane while restricting motion along an axis of rotation, electrostatic forces being used for the vibrational actuation of the gyroscope by means of fixed electrodes wherein a position and a velocity of the proof mass are detected by an output current induced by the motion of the gyroscope, the improvement comprising:

means for driving the gyroscope in a mode where the equations of state for detected positions of the proof mass as a function of time form an elliptical orbit which is characterized after time averaging by orbital parameters including an inclination $\phi$ of the elliptical orbit from a fixed inertial reference frame wherein a rate change of the inclination $\phi$ is physically equal and opposite to an input rotation $\Omega$ of the gyroscope $$\dot{\phi} = -\Omega$$

and where the magnitude of the inclination $\phi$ is physically equal to the negative angle of rotation of the gyroscope $$\phi = -\int_0^t \Omega dt.$$

23. The improvement of claim 22 further comprising means for measuring an angle of rotation of the gyroscope or an angular inclination $\phi$ of the gyroscope by measuring the detected position and velocity of the proof mass and generating $\phi$ according to:

$$\tan 2\phi = \frac{2(\omega_n^2 xy + \dot{x}\dot{y})}{\omega_n^2(x^2 - y^2) + (\dot{x}^2 - \dot{y}^2)}$$

where x and y are the position of the proof mass in the working plane, $\dot{x}$ and $\dot{y}$ are the velocity of the proof mass in the working plane, $\omega_n$ is the natural frequency of the gyroscope.

24. The improvement of claim 22 further comprising means for measuring an angular velocity $\Omega$ of the gyroscope by measuring the detected position and velocity of the proof mass and generating $\Omega$ according to $$\frac{-2H^*\omega_n^2}{E} = |\Omega|\cos\omega_q$$

where $\omega_n$ is the natural frequency of the proof mass, $\omega_q$ is the input frequency applied to the gyroscope, where H* is the mass normalized angular momentum which as been demodulated at by multiplying by cos $2\omega_n t$ and removing all high frequency components above a predetermined cutoff frequency, so that $$H^* = -\frac{(a^2 - b^2)|\Omega|}{4}\cos\omega_q \text{ where}$$

$$(a^2 - b^2) = \frac{2}{\omega_n^2} E$$

$$E = \frac{\omega_n^2(x^2 + y^2) + (\dot{x}^2 + \dot{y}^2)}{2}$$

where E is the normalized system conserved energy, thus resulting in an angular velocity $\Omega$ given by $$\frac{-2H^*\omega_n^2}{E} = |\Omega|\cos\omega_q.$$

25. The improvement of claim 23 further means for comprising measuring an angular velocity $\Omega$ of the gyroscope by measuring the detected position and velocity of the proof mass and generating $\Omega$ according to $$\frac{-2H^*\omega_n^2}{E} = |\Omega|\cos\omega_q$$

where $\omega_n$ is the natural frequency of the proof mass, $\omega_q$ is the input frequency applied to the gyroscope, where H* is the mass normalized angular momentum which as been demodulated at by multiplying by cos $2\omega_n t$ and removing all high frequency components above a predetermined cutoff frequency, so that $$H^* = -\frac{(a^2 - b^2)|\Omega|}{4}\cos\omega_q \text{ where}$$

$$(a^2 - b^2) = \frac{2}{\omega_n^2} E$$

$$E = \frac{\omega_n^2(x^2 + y^2) + (\dot{x}^2 + \dot{y}^2)}{2}$$

where E is the normalized system conserved energy, thus resulting in an angular velocity $\Omega$ given by $$\frac{-2H^*\omega_n^2}{E} = |\Omega|\cos\omega_q.$$

26. The improvement of claim 25 where the means for measuring the angular velocity $\Omega$ of the gyroscope operates simultaneously with the means for measuring the angle of rotation of the gyroscope or angular inclination $\phi$ of the gyroscope.

* * * * *